United States Patent [19]
Mahon et al.

[11] 3,755,034
[45] Aug. 28, 1973

[54] METHOD FOR MAKING A HOLLOW FIBER SEPARATORY ELEMENT

[75] Inventors: Henry I. Mahon, Walnut Creek;
Gene C. Doss, Brentwood; David B. Vang, Walnut Creek, all of Calif.;
David A. Gavin, Miami, Fla.

[73] Assignee: The Dow Chemical Company, Midland, Mich.

[22] Filed: Dec. 10, 1971

[21] Appl. No.: 206,793

Related U.S. Application Data

[63] Continuation-in-part of Ser. No. 118,598, Feb. 25, 1971, abandoned.

[52] U.S. Cl............. 156/169, 156/172, 156/175, 156/180, 156/187, 156/193, 156/425, 156/440
[51] Int. Cl..... B32b 1/08, B31c 13/00, B65h 81/00
[58] Field of Search............. 156/169, 175, 176, 156/177, 178, 179, 180, 187, 193, 440, 441, 430, 425

[56] References Cited
UNITED STATES PATENTS

| | | |
|---|---|---|
| 1,460,949 | 7/1923 | Currier .............................. 156/439 |
| 3,493,455 | 2/1970 | Lebolt et al. ....................... 156/177 |
| 3,616,022 | 10/1971 | Withers ............................... 156/296 |
| 3,649,411 | 3/1972 | Bolles ................................. 156/177 |

*Primary Examiner*—Daniel J. Fritsch
*Attorney*—William M. Yates and H. L. Aamoth

[57] ABSTRACT

A moving belt of hollow fibers is prepared by winding a continuous length of hollow fiber (or fibers) transversely around a pair of moving guide members. The moving fiber belt is convolutely wound upon an axis generally transverse to the direction of movement of said belt to form a fiber bundle. A band of solidifiable resin is applied to at least one transverse section of the hollow fiber bundle and subsequently solidified (cured) to form a tube sheet. The separatory element is then prepared by cutting the tube sheet in a plane generally perpendicular to the bundle axis to form a tube sheet face portion having open fiber ends terminating therein.

11 Claims, 3 Drawing Figures

Patented Aug. 28, 1973   3,755,034
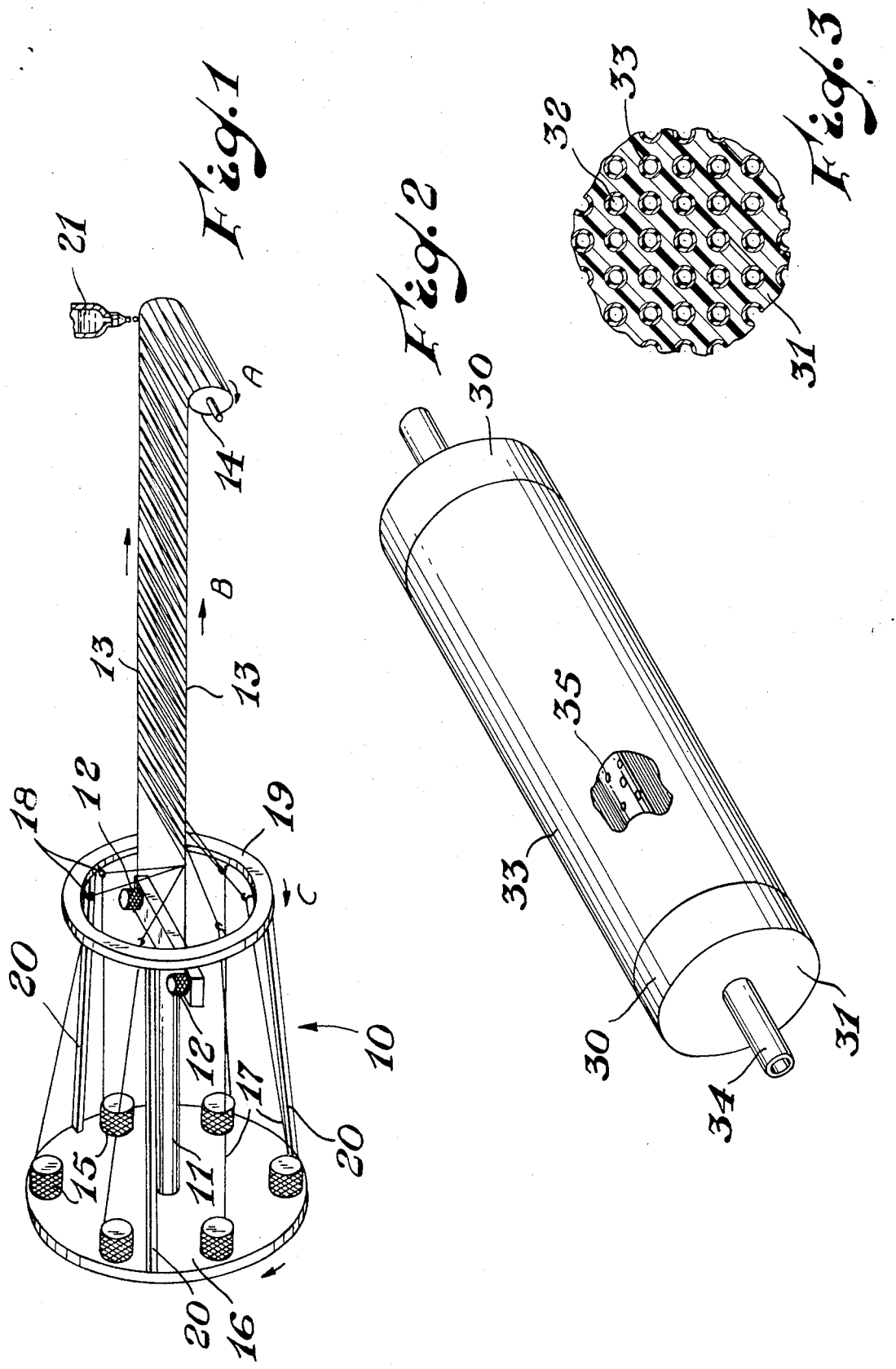

3,755,034

METHOD FOR MAKING A HOLLOW FIBER SEPARATORY ELEMENT

This application is a continuation-in-part of application Ser. No. 118,598 filed on Feb. 25, 1971, now abandoned.

REFERENCES

The invention described herein was made in the course of, or under, a contract with the Office of Saline Water, Department of Interior.

BACKGROUND OF THE INVENTION

The field of this invention relates to a process for making hollow fiber tube bundles which are usefully employed as separatory elements in various fluid separation devices for desalination of brines and like dialytic and osmotic separation purposes. Similar tube bundles prepared from plastic hollow fibers may also be used for heat exchange and other purposes. It is of especial interest to prepare tube bundles composed of a large number of permeable, hollow fibers of very small diameter for desalination and other medical purposes such as a blood oxygenator, artificial kidney and the like.

Known methods for preparing hollow fiber tube bundles are slow, cumbersome and essentially hand fabrication processes. Typical of such processes is the one proposed in U.S. Pat. No. 3,277,959 and illustrated in FIG. 11 of said patent. In addition to the multiplicity of steps needed to prepare a flat warp of fibers which is convolutely wound into a tube bundle it is necessary to cut the fibers at each step resulting in a warp of fibers having open ends at each of the edges of the warp. This presents additional problems when it is desired to fabricate resinous tube sheets at each end of the bundle by virtue of the resinous material flowing into the fiber ends and plugging them. Another similar process is disclosed in U.S. Pat. No. 3,391,041 with essentially the same disadvantages including open ended fibers in the warp.

What is needed is a process for preparing such tube bundle separatory elements which is more adaptable to large scale production, which overcomes or minimizes the problems of the prior art processes and which is capable of processing very small diameter, hollow fibers into a tube bundle.

SUMMARY OF THE INVENTION

A process which provides the needed advantages and benefits described above is the subject of this invention.

In its most basic form, the process of preparing a separatory element comprises in combination the steps of (1) forming a belt of spaced, continuous turns of hollow fibers wound about a pair of guide members by winding at least one continuous length of hollow fiber about a pair of essentially parallel, spaced apart moving guide members, (2) forming a tube bundle by convolutely winding said advancing moving belt about an axis generally transverse to the direction of movement of said belt, (3) forming a resinous tube sheet by applying a solidifiable resin to at least one transverse section of the hollow fiber bundle, preferably applying said resin during the bundle winding step, and curing same, and (4) cutting said tube sheet in a plane generally perpendicular to the bundle axis to form a tube sheet face having open fiber ends terminating therein.

Various process modifications, to be more fully described, are contemplated by this invention.

DRAWINGS

FIG. 1 is a schematic representation of the process of this invention showing the formation of a belt of fibers, formation of a tube bundle by convolutely winding said fiber belt and application of a solidifiable resin to a transverse section adjacent one end of the tube bundle.

FIG. 2 is a more detailed view of a separatory element prepared by the process of this invention wherein the fiber belt was wound around a perforated core and wherein a tube sheet was formed at each end of the bundle.

FIG. 3 is an enlarged view of a portion of the tube sheet face of the separatory element of FIG. 2.

DESCRIPTION OF THE INVENTION

The process of this invention has particular value in fabricating semipermeable membrane separatory devices for use in dialysis, ultrafiltration, reverse osmosis and the like and is especially useful when the separatory device is of the shell and tube type employing a bundle of permeable hollow fiber membranes as the separatory element.

It is an object of this invention to provide a novel process for preparing a bundle of hollow fibers and a separatory element therefrom. The process may also encompass a number of modifications and additions without departing from the essence of this invention.

The process is conveniently described with reference to FIG. 1. A belt of fibers is prepared by means of a rotatable frame 10 mounted to rotate around a stationary guide support 11 (rotation means not shown). On said guide support are mounted two spools 12 of monofilament, such as nylon monofilament, and the guide monofilament 13 from each spool is attached to a wind-up device 14. As the wind-up device 14 rotates (rotation means not shown) in the direction of the arrow A the monofilaments are unwound from the spools 12 and move in the direction of arrow B towards the wind-up device and are wound thereupon. The spools are mounted with an adjustable braking system (not shown) so that a controllable amount of tension is maintained to keep the monofilament guides sufficiently taut as they are unwound from the spools.

Rotatable frame 10 consists of a series of hollow fiber packages 15 mounted on a back plate 16. Said packages 15 supply hollow fibers 17, singly or in tows, through fiber guides 18 mounted in ring 19 for attachment to and winding about the moving monofilament guides. The ring 19 is rigidly attached to the back plate 16 by means of braces 20 or equivalent means. In operation the frame 10 rotates (rotation means not shown) about the stationary guide support 11 in the direction of arrow C whereby the hollow fibers are wound about the pair of monofilament guides 13, as they are simultaneous pulled towards and wound about the wind-up device 14, forming a belt of hollow fibers. The belt of hollow fibers advances towards and is convolutely wound by said wind-up device 14.

As the belt of hollow fibers is convolutely wound a band of a solidifiable resin 21 is applied adjacent to one end of the bundle of hollow fibers and subsequently cured to form a resinous tube sheet. After a hollow fiber tube bundle of sufficient size has been formed, the process is stopped to remove said bundle, reattach the monofilament guides to the wind-up device and then start the process again to form another tube bundle. If the resin is not fully cured the tube bundle may be placed in an oven at an appropriate temperature to accelerate the cure or can be stored and allowed to cure at room temperature.

To convert the tube bundle to a separatory element it subsequently subsequently cut in a plane generally perpendicular to the axis of said tube bundle through the cured resin tube sheet. The cutting step forms a planar surface called a tube sheet face having open fiber ends terminating therein.

A number of process modifications and additions are further contemplated by this invention. Various other mechanical means than the rotatable frame shown in FIG. 1 may be used to wrap hollow fibers about the pair of monofilament guides.

While monofilament guides were described with respect to the description of FIG. 1 many different kinds of guide members may be employed. In addition to a variety of monofilaments such as nylon monofilament, other guide member materials include wire, twisted or braided multifilaments of polyester, nylon, cotton, hemp, etc., tapes, and the like.

Hollow fibers useful in permeation separatory processes are well known and encompass many different kinds of polymeric materials. For example, cellulose and cellulose esters such as cellulose triacetate have been widely used, but a variety of other polymeric materials may be employed such as are described in U.S. Pat. No. 3,228,876 and U.S. Pat. No. 3,339,341. The invention is not limited to the type of hollow fiber material but may include polyamides, polyesters, polyolefins, polysiloxanes, polystyrene and many other well known polymeric materials.

Generally, the process of this invention is of most value in fabricating separatory elements employing very fine bore, thin walled hollow fibers. Hollow fibers with an outside diameter as small as 10 microns may be prepared. Frequently the outside diameter ranges from 10 to 50 microns but depending on the end use fibers up to 300 to 500 microns and even larger may be prepared. The wall thickness correspondingly may vary from about 1 micron up to 50 microns. Fine bore hollow fibers of these dimensions provide the greatest amount of surface area per cubic foot and for this reason are frequently preferred. The invention is not necessarily limited to fine bore fibers, however.

The belt of hollow fibers may be simply wound in a convolute fashion along an edge of said belt transverse to the guide members or the belt may be convolutely wound about a core or preferably a hollow, perforated core which subsequently may be used as a fluid inlet or outlet header to the fiber bundle. Such a fluid header advantageously provides improved uniformity of fluid flow through the fiber bundle which is quite important in, for example, desalination wherein the brine usually flows through the fiber bundle and the permeate is withdrawn from the interior of the fibers and where the concentrated brine if in a stagnant area could cause fouling and loss of efficiency of the unit.

Perforated cores may take a variety of shapes. They may be cylindrical, generally cylindrical but tapered at the ends, cylindrical with smaller diameter end portions, etc. and the cores may have grooves in their outer surface for better fluid flow distribution.

FIG. 2 shows a separatory element prepared according to the above described process in which the fiber belt was wound around a perforated, cylindrical core and was fabricated to have two tube sheets. The tube sheets 30 have been cut to provide a face (planar surface) 31 having open ends 32 of the hollow fibers 33 terminating therein. A plurality of fibers 33 extend between the two tube sheets 30 and access to the interior of the fibers is possible from either end. A core 34 having perforations 35 is centrally disposed and sealed in liquid tight arrangement to the resin tube sheet 30. A portion of the tube sheet face 31 is enlarged in FIG. 3 to show the open ends 32 of the hollow fibers 33 sealed within the resinous tube sheet 30.

The tube sheets are formed by applying a solidifiable resin to a transverse section of the hollow fiber bundle. More than one such tube sheet may be formed. A separatory element with a single tube sheet may be formed by applying the resin to a transverse section adjacent one end of the fiber bundle. Depending on the width of the hollow fiber bundle it may be more convenient to apply the resin to a centrally located transverse section whereupon, after curing, cutting through the transverse section will produce two separatory elements, each with a single tube sheet. As shown above a separatory element with a tube sheet at each end may be formed. It is also possible with a wide fiber belt to produce several separatory elements at one time such as by applying a solidifiable resin to each of several spaced apart transverse sections of the fiber bundle.

It is possible to inject or emplace a solidifiable material into the wound fiber bundle to prepare a tube sheet, but it is preferable and more convenient to apply the resin to the bundle as it is being wound up to insure uniform embedment of each of the fibers in the potting resin. U.S. Pat. No. 3,492,698 describes a centrifugal method of forming tube sheets with an already formed bundle.

In addition, after the hollow fiber tube bundle has been formed on the wind-up device, the tube sheets may be built up to a larger diameter than the diameter of said bundle by applying more of the solidifiable material to the tube sheet band and if desired, the use of reinforcing materials such as glass fibers or tapes, etc. After curing, the tube sheet can then be machined to a precise diameter and an O-ring groove machine for the fluid tight seal between the tube sheet and the outer casing.

It is also possible to insert the tube bundle from the wind-up device into a casing assembly and directly cure the tube sheet to the casing. In fact, the casing may be directly fabricated around the tube bundle before the solidifiable material has cured and the whole unit cured into an integral structure.

In a manner similar to that for preparing the tube sheets, resinous baffles may also be fabricated to direct the flow of fluids through the fiber bundle.

Many types of solidifiable materials may be used including a molten thermoplastic resin which hardens on cooling. Generally, however, thermosettable or polymerizable materials are employed to obtain solvent resistance, chemical resistance, strength to resist high pressures and temperatures, and the like. Epoxy resins are preferred for many applications. Silicone rubbers are preferred in fabricating medical devices such as an artificial kidney. Frequently the solidifiable material must be catalyzed in order to solidify properly, in which case the invention contemplates separately adding the catalyst and said solidifiable material if the combination thereof sets up too rapidly to be conveniently added to the fiber bundle during the wind-up step.

In addition to guide members at the edge of the belt of fibers it is also possible to employ additional monofilaments and the like to provide support for a wide fiber belt or tapes and the like if it is desired to provide a spacing element between successive layer of fibers as it is wound into a bundle.

The speed of the advancing guide members may also be varied in relation to the speed of winding the hollow fibers around same to vary the pattern of the fibers from a very close alignment resulting in a fiber bundle where the fibers are in nearly parallel arrangement to a more open alignment where the fibers in the fiber bundle have a crisscrossed arrangement.

The wind-up device may also be driven at a constant speed or the speed may be automatically varied to obtain a constant belt speed as the diameter of the convolutely wound fiber bundle increases.

The moving belt of hollow fibers may occasionally require that slippage of the hollow fibers along the guide element be minimized or prevented. This can be accomplished in different ways. The guide members may comprise tapes with a contact adhesive on at least one side or tapes may be used having an adhesive material coated thereon which is activated by heat or some other means. In place of adhesives it has been found that the edge of the moving fiber belt and the corresponding fiber bends may be exposed to a sufficient amount of heat to soften the fiber whereby the fiber bend flattens out. Upon cooling the bend retains its flattened configuration and is less apt to slip.

Many hollow fiber devices require some form of treatment after spinning of the fiber, usually a chemical treatment, to achieve or alter the permeation characteristics. Frequently, merely leaching of the fiber to remove a plasticizer and/or some other additive is all that is required. Some cellulose triacetate hollow fibers achieve optimum permeability if leached in hot water (50°-80° C). In other cases chemical modification may be desired such as hydrolysis of cellulose acetate to cellulose.

The process of this invention is readily adaptable to treating the fibers of the fiber belt prior to winding-up said belt to form a tube bundle. All that need be done is to direct the fiber belt into the treatment bath or chamber prior to winding it up into a tube bundle. Excess moisture on the surface of the fibers may interfere with the bonding or curability of the solidifiable material in which case means should be employed to remove this surface moisture or liquid, such as drying by blowing warm air across the belt or by use of a vacuum. When the fiber is to be treated in some manner, it is frequently advantageous to fix the fiber bends to the guide elements to prevent slippage.

Employing the apparatus of FIG. 1 a moving belt of hollow fibers was prepared and convolutely wound about a tapered perforated core.

Nylon monofilament, 4 lb. test, was employed as the moving guide members which were attached to a tapered perforated core of polyvinyl chloride having a threaded surface (grooved surface). The monofilament advance rate initially was about 8 in. per minute and was gradually increased during winding to about 18 in. per minute at the end of the process.

Sulfolane plasticized cellulose acetated hollow fibers were employed. The fibers had an outside diameter of about $46\mu$ and an inside diameter of about $30\mu$. A total of about 180 gms of fiber was incorporated into a bundle and subsequent test cell. The fiber winding operation employed six packages of fiber revolving at a rate of 341 rpm about the nylon monofilament guides. With each revolution the fiber strand from each package laid down two lengths of fibers on the moving belt, one "above" and one "below." Since each strand contained 16 fibers this meant that the total fiber lay-down rate was about 64,000 fiber lengths per minute ($341 \times 6 \times 2 \times 16$). By fiber length it is meant that portion of each continuous length fiber necessary to span the distance from one guide to another.

In the manner of FIG. 1 and employing the above materials and conditions a moving belt of hollow fibers was prepared and convolutely wound around the perforated core.

During the winding step it is convenient to continuously apply a thin line of a solidifiable resin adjacent at least one end of the fiber bundle as it is being formed by the winding step. In this way each of the fibers are uniformly wet by the resin and the possibility of leaks are greatly reduced and may be eliminated altogether. For non-medical uses an epoxy resin provides excellent properties in the cured tube sheet. Medical grade silicone rubber is preferred for blood oxygenators, artificial kidneys and the like.

An epoxy formulation employed quite successfully in the above process consists of the following:

|  | Wt. % |
|---|---|
| Glycidyl polyether bisphenol A (EEW172-178) | 55.49 |
| Glycidyl polyether bisphenol A (EEW186-192) | 18.87 |
| Dibutyl phthalate | 14.79 |
| Curing Agent Z* | 7.69 |
| Triethanol amine | 0.04 |
| Lactic acid | 0.44 |
| Colloidal silica (Cab-O-Sil) | 2.68 |
|  | 100.00 |

*adduct of m-phenylene diamine and methlene diamine with phenyl glycidyl ether. See U.S. Pat. No. 3,339,633.

To lay down a thin band of resin the epoxy resin formulation is pumped from a continuous mixer through a No. 18 × 2" long hypodermic needle. Two such needles are used as dispensing heads if a tube sheet at each end is desired. After fabrication of the bundle the cure of the epoxy resin may be completed by heating for 5 hours in a 60° C oven. The temperature of cure will vary depending on the composition of the hollow fiber and should not exceed a temperature which would degrade or materially alter the permeability of the fiber if the intended use of the device is for reverse osinosis or like separations.

Following cure of epoxy resin the resinous tube sheet is then cut in a plane generally perpendicular to the axis of the bundle to form open ended fibers such as shown in FIG. 3. The separatory unit is then sealed inside a casing wherein water tight seals between the tube sheet and the casing are prepared thus permitting fluid flow through the fibers separate from fluid flow around the exterior of the fibers. Such units are comparable to the familiar shell-and-tube heat exchangers.

Before use as a dialyzer, etc. the cellulose acetate fibers are soaked in water for a sufficient length of time to extract the sulfolane plasticizer. Such water soaking may not be needed if other polymeric materials than cellulose acetate are employed in preparing the hollow fibers.

In place of epoxy resins, units designed for use as an artificial kidney or the like may be prepared in which a medically approved grade of silicone rubber is used to prepare the tube sheets. Typical of these materials is a polysiloxane elastomer marketed as Medical Grade Silastic 382 which is vulcanizable (crosslinkable) when mixed with stannous octoate (0.3 percent by wt. is effective) and allowed to cure for about 24 hours at room temperature. An artificial kidney is useful in dialyzing the blood of a person with malfunctioning kidneys in order to remove body waste products such as urea which the body can no longer excrete.

The process itself has great value as an improved method for forming bundles of hollow fibers into a separatory unit similar to shell-and-tube type heat exchangers.

What is claimed is:

1. A process for preparing hollow fiber separatory elements which comprises in combination the steps of
   a. forming a belt of spaced, continuous turns of hollow fibers wound about a pair of guide members by winding at least one continuous length of hollow fiber about a pair of essentially parallel, spaced apart moving guide members;
   b. forming a bundle of hollow fibers by convolutely winding a length of said belt, sufficient to form said bundle, about an axis generally transverse to the direction of movement of said belt;
   c. forming a tube sheet by applying a band of a solidifiable resin to at least one transverse section of said hollow fiber bundle and curing said resin; and
   d. cutting said tube sheet in a plane generally perpendicular to the axis of said bundle to form a tube sheet face portion having open fiber ends terminating therein.

2. The process of claim 1 wherein said guide member is a monofilament, a multifilament or a tape.

3. The process of claim 1 wherein said tube sheet is formed by applying the solidifiable resin during the winding step (b).

4. The process of claim 3 wherein a tube sheet is formed at each end of said bundle by applying a band of the solidifiable resin adjacent each end of said bundle.

5. The process of claim 1 wherein said bundle is formed by convolutely winding said belt around a perforated core.

6. The process of claim 1 wherein said solidifiable resin is a catalyzed epoxy resin.

7. The process of claim 1 wherein said resin is a silicone rubber.

8. The process of claim 1 wherein said moving belt is exposed at its edges to a sufficient amount of heat to soften and flatten the hollow fibers thereat.

9. The process of claim 1 wherein said guide members have an adhesive surface.

10. The process of claim 1 wherein said hollow fiber is a semipermeable hollow fiber useful for ultrafiltration, dialysis or reverse osmosis.

11. The process of claim 1 further comprising the step of chemically modifying the fibers prior to the bundle winding step by passing the fiber belt through a chemical treatment step.

* * * * *

UNITED STATES PATENT OFFICE
CERTIFICATE OF CORRECTION

PATENT NO. : 3,755,034
DATED : August 28, 1973
INVENTOR(S) : HENRY I. MAHON et al It is certified that error appears in the above-identified patent and that said Letters Patent are hereby corrected as shown below:

Item [73]: "The Dow Chemical Company, Midland, Mich."

should read -- The United States of America as represented by The Secretary of the Interior, Washington, D. C. --

Signed and Sealed this tenth Day of February 1976

[SEAL]

Attest:

RUTH C. MASON
*Attesting Officer*

C. MARSHALL DANN
*Commissioner of Patents and Trademarks*